(12) United States Patent
Johns

(10) Patent No.: US 7,859,872 B1
(45) Date of Patent: Dec. 28, 2010

(54) LOAD VOLTAGE-INDEPENDENT ACTIVE POWER CONTROL OF POWER CONVERTERS

(75) Inventor: David M. Johns, Groveland, MA (US)

(73) Assignee: Kaiser Systems, Inc., Beverly, MA (US)

(*) Notice: Subject to any disclaimer, the term of this patent is extended or adjusted under 35 U.S.C. 154(b) by 18 days.

(21) Appl. No.: 12/471,390

(22) Filed: May 24, 2009

(51) Int. Cl.
*H02M 1/42* (2007.01)
*G05F 1/70* (2006.01)

(52) U.S. Cl. .................................. 363/89; 323/207
(58) Field of Classification Search ............ 363/79–81, 363/89; 323/205, 207, 222, 285, 351
See application file for complete search history.

(56) References Cited

U.S. PATENT DOCUMENTS

| 5,006,975 A | * | 4/1991 | Neufeld ................ 363/80 |
| 5,351,180 A | * | 9/1994 | Brennen et al. ........... 363/71 |
| 5,391,976 A | * | 2/1995 | Farrington et al. ......... 323/207 |

* cited by examiner

*Primary Examiner*—Gary L Laxton
*Assistant Examiner*—Nusrat J Quddus
(74) *Attorney, Agent, or Firm*—Philip O. Post

(57) ABSTRACT

The magnitude and wave shape of instantaneous power draw from a single phase alternating current power source to a power converter is controlled by a closed loop power control scheme independent of the direct current output voltage of the converter. A fast averaging methodology for the value of control magnitude and wave shape of the instantaneous power draw by the converter from the alternating current source can be used in the closed loop power control scheme to limit the magnitude of power draw.

18 Claims, 8 Drawing Sheets

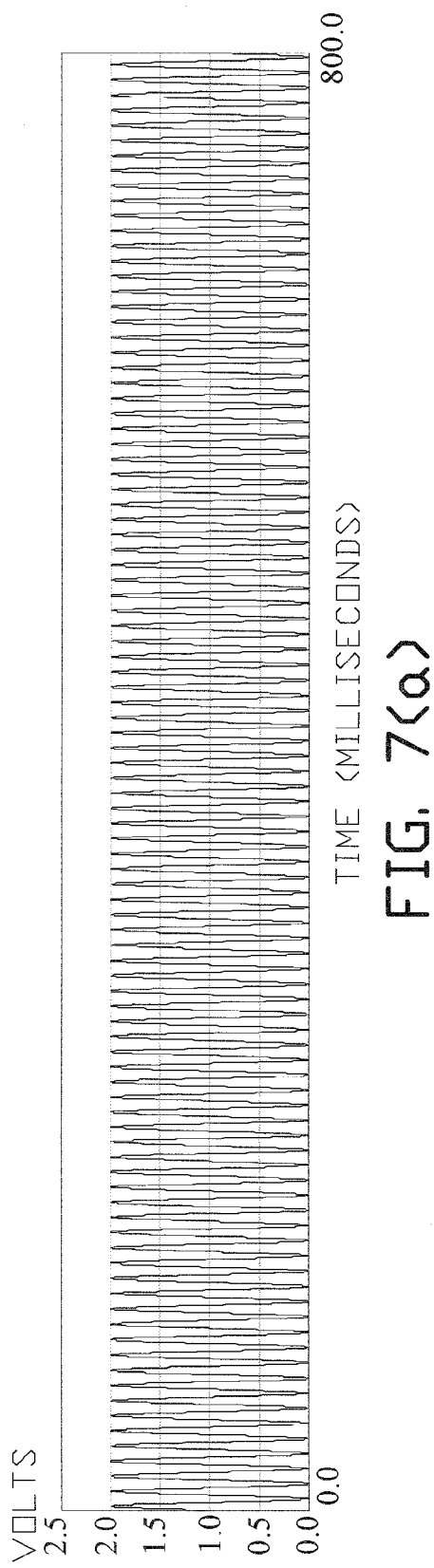
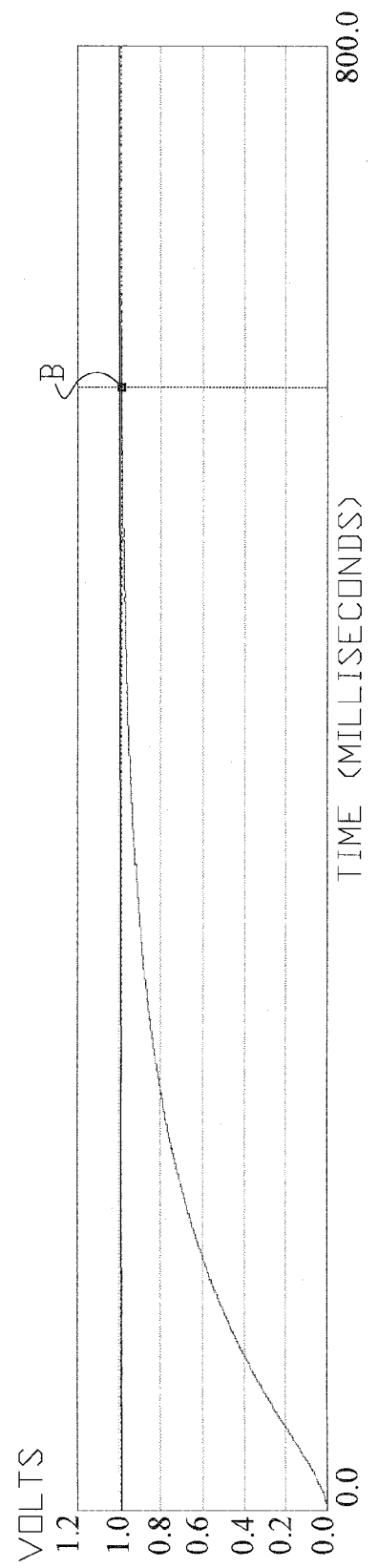

LOAD VOLTAGE-INDEPENDENT ACTIVE POWER CONTROL OF POWER CONVERTERS

CROSS REFERENCE TO RELATED APPLICATIONS

Not applicable.

FIELD OF THE INVENTION

The present invention relates generally to active output power control of single phase converters and, in particular, to active output power control where the control method is independent of the load voltage of the converter.

BACKGROUND OF THE INVENTION

In typical power conversion applications, for example, where the conversion is from alternating current (AC) to direct current (DC), feedback information from the DC output load voltage is a required input variable to the power and power factor control process that can be implemented by hardware, software or a combination thereof. Consequently closed loop power control, and power factor control, is dependent upon load voltage and inherent load voltage ripple.

Furthermore known pulse width modulated (PWM) power factor controllers do not limit instantaneous power in a linear manner. If AC input current exceeds an over current threshold, the PWM controller truncates the gate drive pulse width to instantly limit current and protect the power circuit. This discontinuous current limit boundary distorts the AC current draw, which increases the total harmonic distortion (THD) of the AC input current during such current limiting conditions.

Known power factor controllers are fundamentally designed to regulate a fixed DC output voltage, thus behaving as a constant voltage source. The power quality obtained with such controllers is therefore a function of the feedback obtained from the load voltage, and the magnitude of the instantaneous power drawn from the power source is a direct function of the instantaneous power drawn from the load, within the bandwidth of the error amplifier.

Known power factor controllers use an average current mode control, or peak current mode control, of the power converter. These traditional methods require voltage feedback information from the output load voltage as a control input to the power control circuit. Therefore, ripple voltage and other dynamic transients in the load affect the quality of the current drawn from the power source. The compensated voltage feedback amplifier is typically designed to prevent load voltage ripple from modulating the power control circuit, which would increase harmonic distortion. The bandwidth of the amplifier must therefore be low enough to attenuate the second harmonic of the input voltage frequency. High bandwidth control inherently increases harmonic distortion in these traditional power factor controllers.

It is one object of the present invention to provide closed loop power control and power factor control for a single phase power converter that does not require feedback information from the output of the converter.

It is another object of the present invention to provide controlled power conversion with up to exact unity power factor into DC loads, or pulsed DC loads that may dynamically vary in voltage magnitude.

It is another object of the present invention to provide a power factor control method that bounds both AC input current and AC input power as required by the state of the input voltage of AC power source to produce a robust system, with current and power defined, linearly controlled and linearly bounded, unlike traditional PWM controllers.

It is another object of the present invention to provide a power factor control method that results in low total harmonic distortion during current limit mode operation by linearly bounding both AC input power and current, thereby preserving power quality even when the control circuit is in current limit mode.

It is another object of the present invention to provide constant power quality control into a varying output load voltage, with active power factor correction completely independent of the output voltage feedback that is particularly beneficial for applications requiring variable programmable output voltage control, or for systems that desire a constant power draw into partial discharge or full discharge systems where the load power is highly dynamic.

BRIEF SUMMARY OF THE INVENTION

In one aspect, the present invention is an apparatus for, and method of, controlling the desired magnitude and wave shape of the instantaneous power draw from a single phase source to a power converter via a closed loop power control scheme.

In another aspect, the present invention is an apparatus for, and method of, active control of the power factor of the instantaneous power draw from a single phase source to a power converter via a closed loop power control scheme.

In another aspect, the present invention is an apparatus for, and method of, controlling the desired magnitude and wave shape of the instantaneous power draw from a single phase source to a power converter via a closed loop power control circuit utilizing a fast average value of the desired magnitude and wave shape of the instantaneous input power and a selected maximum average input power value to constrain the closed loop power control circuit to the selected maximum average input power value.

In another aspect, the present invention is an apparatus for, and method of, controlling the desired magnitude and wave shape of the instantaneous power draw from a single phase source to a power converter via a closed loop power control circuit, by utilizing a maximum RMS input current value to constrain the closed loop power control circuit to the selected maximum RMS current value.

In another aspect, the present invention is an apparatus for, and method of, controlling the desired magnitude and wave shape of the instantaneous power draw from a single phase source to a power converter via a closed loop power control circuit utilizing a maximum RMS input current value, a fast average value of the desired instantaneous input power, and a selected maximum average input power value to constrain the closed loop power control circuit to the selected maximum average input power value.

In another aspect, the present invention is an apparatus for, and method of, controlling the desired magnitude and wave shape of the instantaneous power draw from a single phase AC source to an AC to DC power converter via a closed loop power control circuit where the converter load comprises a capacitor load, and charging of the capacitor load is stopped by an inhibit signal to the closed loop power control circuit, where the inhibit signal is obtained by comparison of the load voltage with a selected maximum output DC voltage.

In another aspect, the present invention is an apparatus for, and method of, controlling the desired magnitude and wave shape of the instantaneous power draw from a single phase AC source to an AC to DC power converter via a closed loop power control circuit where the converter load comprises a capacitor load, and charging of the capacitor load is stopped by reducing converter power proportional to the output of a compensated error amplifier that subtracts the load voltage from a selected maximum output DC voltage.

The above and other aspects of the invention are set forth in this specification and the appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 7(a) graphically illustrates a sinusoidal waveform inputted to the filter network shown in FIG. 5(b) with the filter network's DC output voltage response illustrated in FIG. 7(b).

DETAILED DESCRIPTION OF THE INVENTION

Figure 1:
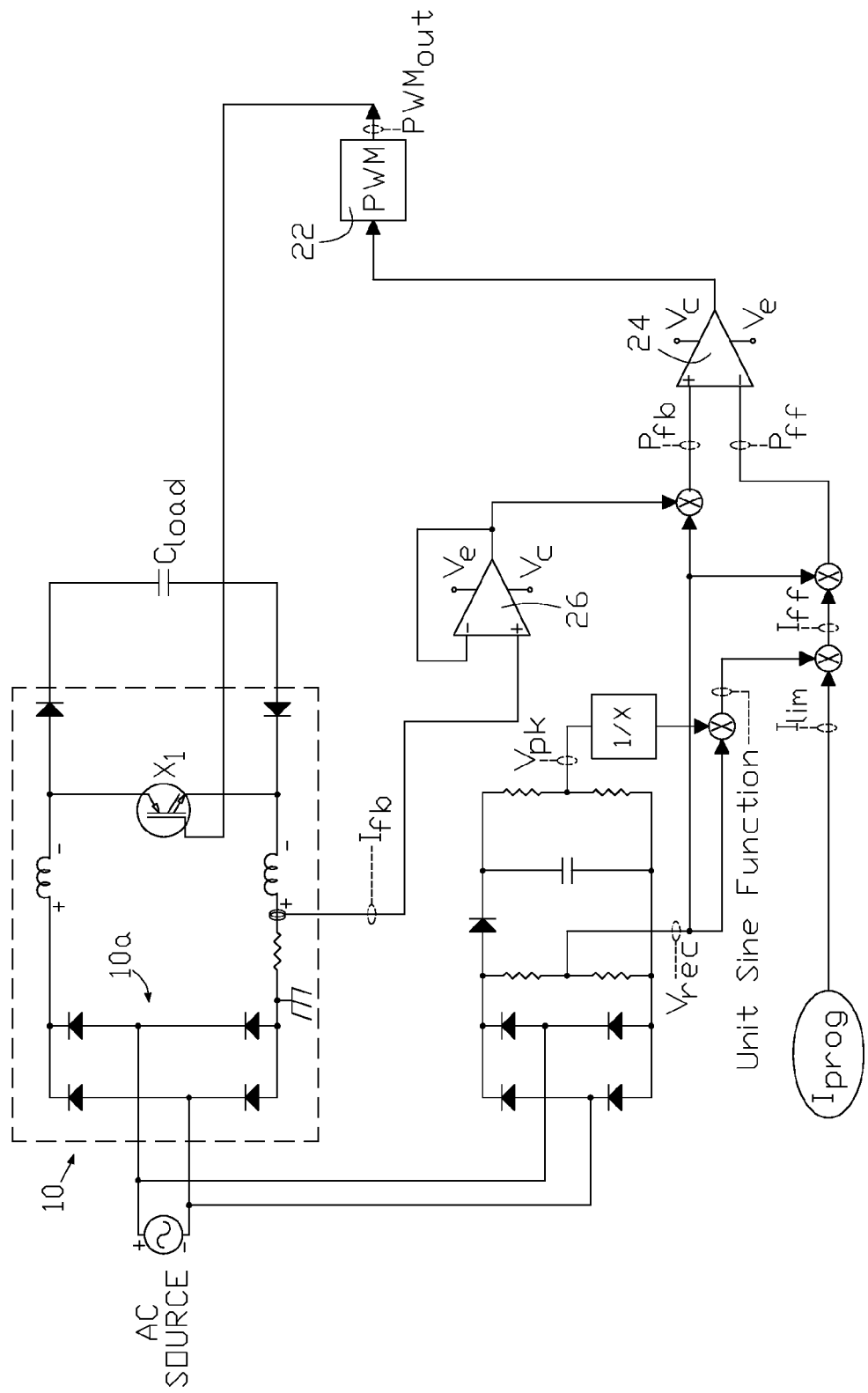
FIG. 1 is a simplified schematic diagram of one example of the active power control apparatus and method of the present invention.
Figure 2:
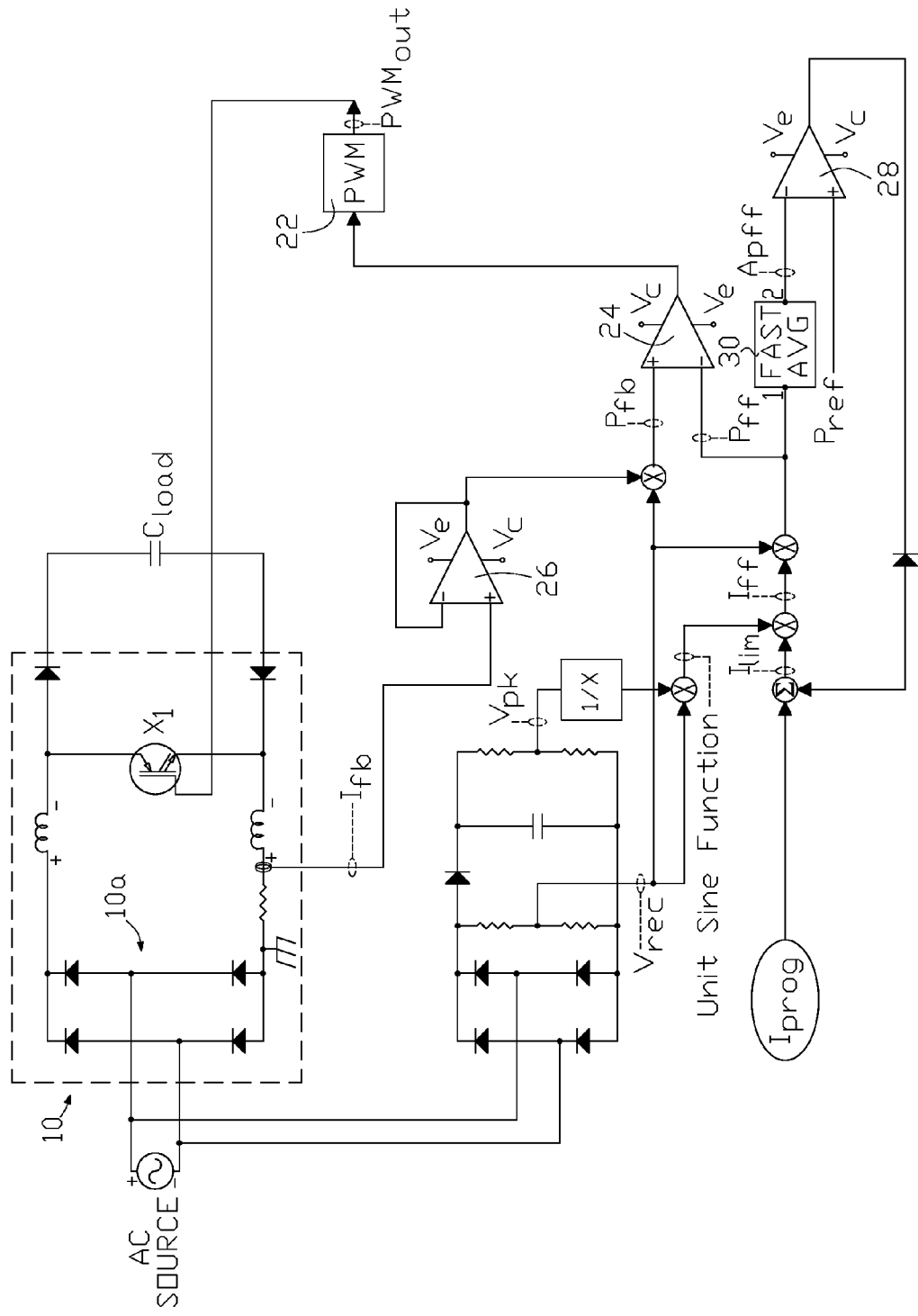
FIG. 2 is a simplified schematic diagram of another example of the active power control apparatus and method of the present invention.
Figure 3:
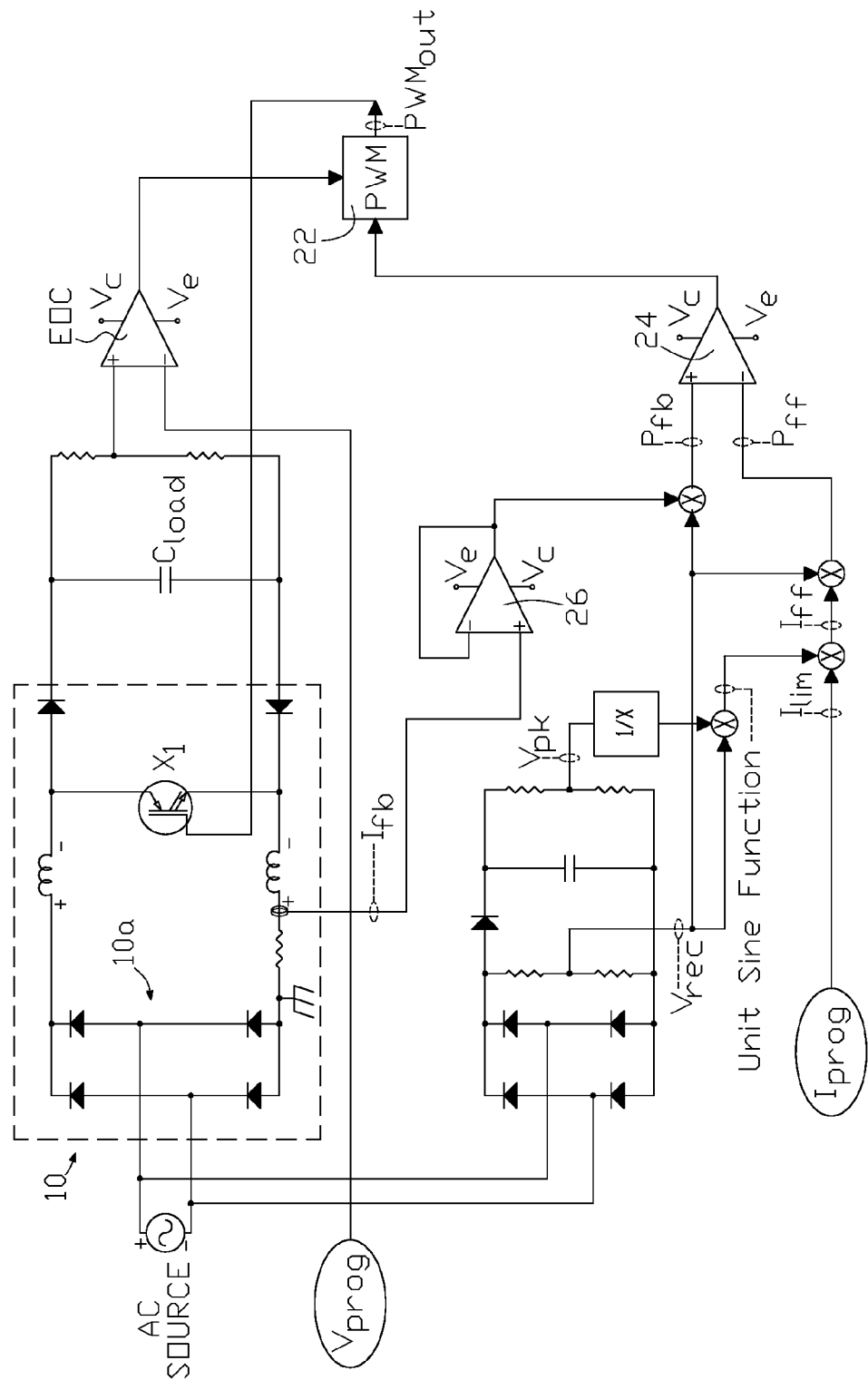
FIG. 3 is a simplified schematic diagram of another example of the active power control apparatus and method of the present invention as applied to a capacitive load charging application.
Figure 4:
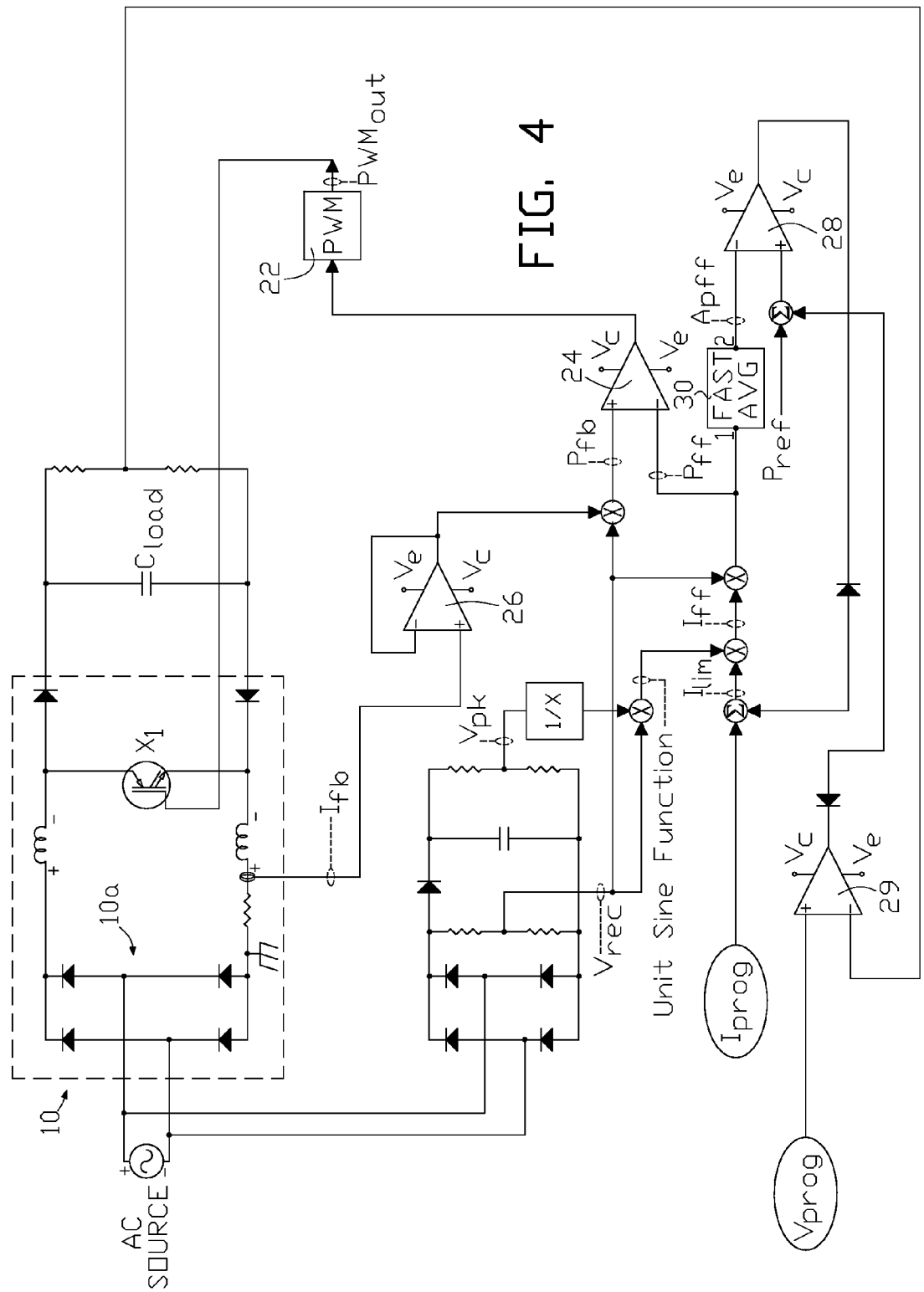
FIG. 4 is a simplified schematic diagram of another example of the active power control apparatus and method of the present invention as applied to a capacitive load charging application.

There is shown in FIG. 1, FIG. 2. FIG. 3 and FIG. 4 typical examples of circuits that can be used for the load voltage-independent active converter power control of the present invention. In these figures an AC to DC power converter 10 is represented in simplified form as full wave diode bridge 10a with input power supplied from single phase "AC SOURCE." DC output from the converter is controlled by representative boost switch device $X_1$ and supplied to representative capacitive load $C_{load}$. In other examples of the invention, the boost switch device may comprise any arrangement of power conversion switching devices that are controlled, for example, by gate signals. The active power control apparatus and method of the present invention may be applied to various converter topologies, such as, but not limited to, buck, boost, flyback, or combinations thereof.

Signals and parameters designated in FIG. 1, FIG. 2, FIG. 3 and FIG. 4 are as described in the following table.

| Drawing symbol | Signal nomenclature | Signal description |
| --- | --- | --- |
| $V_{rec}$ | Rectified Input Voltage | Scaled and rectified voltage signal that represents the instantaneous absolute value of the converter's input AC voltage from AC SOURCE. |
| $V_{pk}$ | Peak Input Voltage | DC voltage value that represents the peak magnitude of the rectified converter's input AC voltage from AC SOURCE. |
| $I_{prog}$ | Programmed Input Current | DC voltage value proportional to a selected (control) level of maximum RMS current from the AC SOURCE. |
| $P_{ref}$ | Reference Power | DC voltage value proportional to a selected (control) maximum average input power value from the AC SOURCE. |
| $I_{ff}$ | Feed Forward Current | Dynamic DC voltage value representing the desired (control) magnitude and wave shape of the instantaneous converter input current. |
| $P_{ff}$ | Feed Forward Power | Dynamic DC voltage value representing the desired (control) magnitude and wave shape of the instantaneous power draw by the converter from the AC SOURCE. |
| $A_{pff}$ | Average Feed Forward Power | DC voltage value representing a "fast average" value of the Feed Forward Power signal, which can be derived from an analog, digital or combination of an analog and digital computation as further described below. |
| $I_{fb}$ | Feedback Current | Dynamic DC voltage value representing the instantaneous current in the converter's power circuit. |
| $P_{fb}$ | Feedback Power | Dynamic DC voltage value representing the instantaneous power draw by the converter from the AC SOURCE. |
| $I_{lim}$ | Limit Current | DC voltage value proportional to the instantaneous, real-time RMS current as may be determined by alternative methods described below. |
| $V_{prog}$ | Programmed Output Voltage | DC voltage value representing the desired (control) maximum converter output DC voltage. |

$I_{prog}$, $V_{prog}$ and $P_{ref}$ may each be an internally, or externally, selected or programmed value. For example, internally the selected value may be fixed by selected circuit components, or a constant value stored in a suitable computer memory device that can be accessed by a processing device executing a software program that controls power converter 10 via suitable input and output hardware interfaces. Externally the selected value may be variably inputted from a control device such as a voltage potentiometer.

The value of the Feed Forward Current ($I_{ff}$) signal can be calculated from the following equation:

$$I_{ff} = I_{lim} * \left[ \frac{V_{rec}}{V_{pk}} \right] \qquad \text{(equation 1)}$$

as schematically represented in FIG. 1, FIG. 2, FIG. 3 or FIG. 4.

The value of the Feed Forward Power ($P_{ff}$) signal can be calculated from the following equation:

$P_{ff} = I_{ff} * V_{rec}$ (equation 2) as schematically represented in FIG. 1, FIG. 2, FIG. 3 or FIG. 4.

The value of the Feedback Power ($P_{fb}$) signal can be calculated from the following equation:

$P_{fb} = I_{fb} * V_{rec}$ (equation 3) as schematically represented in FIG. 1, FIG. 2, FIG. 3 or FIG. 4, with the Feedback Current ($I_{fb}$) optionally conditioned by buffer amplifier 26.

As illustrated in FIG. 1, FIG. 2, FIG. 3 or FIG. 4, one example of a closed loop power control circuit utilized in the present invention comprises PWM controller 22 and frequency compensated error amplifier 24. PWM controller 22 outputs a gate drive signal (PWM$_{out}$) to representative boost switch device X$_1$. The gate drive signal is proportional in outputted pulse width to the output of frequency compensated error amplifier 24. Inputs to error amplifier 24 are the Feedback Power and Feed Forward Power signals as described above. The closed loop power control circuit forces the instantaneous power draw from the converter to follow the desired control Feed Forward Power signal in magnitude and wave shape. Amplifier 24 follows the dynamic instantaneous Power Feed Forward signal with high bandwidth fidelity, which provides the power converter with high bandwidth, fast transient response. More generally amplifier 24 may be any circuit that compares the value of the Feed Forward Power signal to the value of the Feedback Power signal to output a delta output power signal equal to the difference between the Feed Forward and Feedback Power signals. More generally PWM controller 22 may be any device that outputs a control signal (such as a gating signal) proportional to the delta output power signal for controlling the power conversion switching devices utilized in a particular converter application.

By satisfying the instantaneous Feed Forward Power command signal, the AC SOURCE input current to the converter follows in-phase with the AC SOURCE input voltage to provide active power factor correction. The high bandwidth fidelity of power error amplifier 24 allows the converter to achieve exact unity power factor with low (for example, less than 2.5 percent) total harmonic distortion.

If the AC SOURCE input voltage root mean square (RMS) value fluctuates, the current draw will also fluctuate with inverse proportionality in order to follow the value of the Feed Forward Power signal resulting in closed loop power control. Consequently the system parameter enclosed by the control loop is the power of the converter system, and not voltage or current as in the prior art.

As described above and shown schematically in the figures, the Limit Current (I$_{lim}$) signal is a DC value proportional to the instantaneous RMS input current to the converter. The Limit Current signal is scaled by $\sqrt{2}$ to match the peak value of the sine wave of a desired control RMS value since $$I_{RMS} = \frac{I_{peak}}{\sqrt{2}}.$$

A rectified Unit Sine Function signal is artificially created by dividing the rectified AC SOURCE input voltage sine signal by its peak value $$\left(\frac{V_{rec}}{V_{pk}}\right)$$

as schematically represented in the figures. This signal has a magnitude of unity and a wave shape that is proportional to, and in phase with, the rectified AC SOURCE input voltage. The value of the rectified Unit Sine Function signal is multiplied by the value of the Limit Current (I$_{lim}$) signal in order to create the Feed Forward Current (I$_{ff}$) signal, as schematically represented in the figures. By mathematical definition, and as implemented in the present invention, if the AC SOURCE current inputted to the converter follows the Feed Forward Current signal, exact unity power factor will be achieved.

Preferably in some examples of the invention, the DC value of the Limit Current (I$_{lim}$) signal as shown in FIG. 1 may be modified, for example, as shown in FIG. 2. The maximum value of I$_{lim}$ is typically equal to the Programmed Input Current (I$_{prog}$) value as shown in FIG. 1. But the resulting mathematical product of I$_{ff}$ (when I$_{lim}$ is equal to I$_{prog}$) and V$_{rec}$, may result in a Feed Forward Power value in excess of the desired power control limit. In order to constrain the power control so that the desired power draw is not exceeded, Average Feed Forward Power (A$_{pff}$) signal and Power Reference (P$_{ref}$) signal are provided as inputs to frequency compensated error amplifier 28 as shown in FIG. 2. The output of amplifier 28 reduces (and only reduces) the value of I$_{lim}$. I$_{prog}$ need not change, but I$_{lim}$ is made a variable DC signal since I$_{lim}$ is the sum of I$_{prog}$ and the output of amplifier 28. Therefore the value of I$_{lim}$ is dynamically modified in order to force the controller to obey the desired control power limit as illustrated in the example of the invention shown in FIG. 2.

Figure 5A:
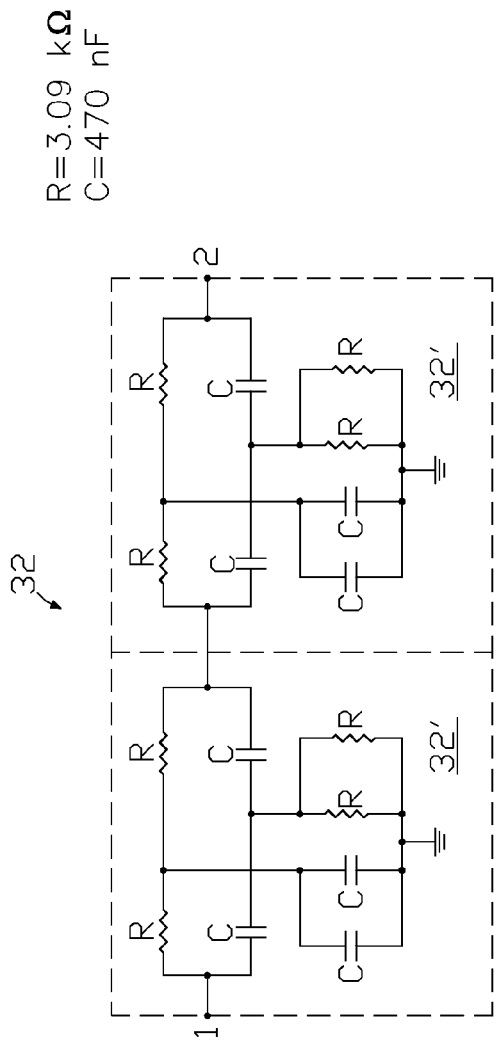
FIG. 5(a) illustrates one example of a fast averaging circuit used to determine a fast average value of a sinusoidal waveform and utilized in some examples of the active power control apparatus and method of the present invention.
Figure 6A:
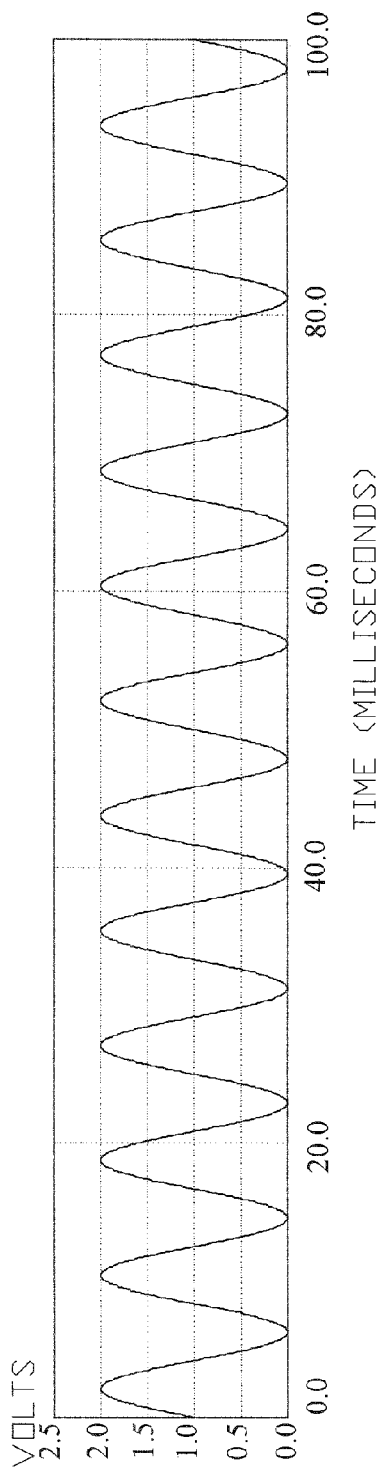
FIG. 6(a) graphically illustrates a sinusoidal waveform inputted to the filter network shown in FIG. 5(a) with the filter network's DC output voltage response illustrated in FIG. 6(b).
Figure 6B:
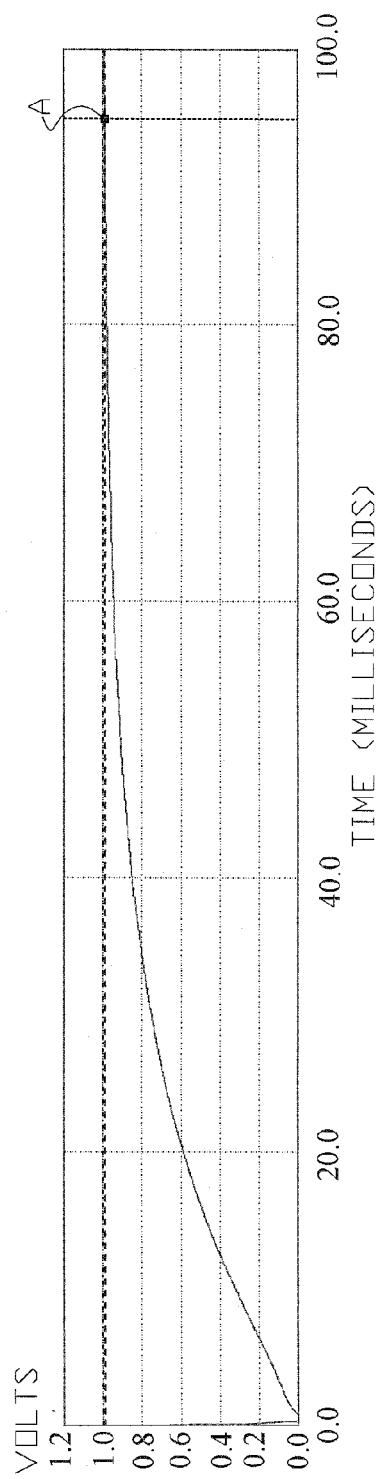

FIG. 5(a) illustrates one analog "fast averaging" circuit (FAST AVG) 30 (in FIG. 2) that can be used to obtain a "fast average" dynamic DC voltage value for the Average Feed Forward Power signal. The fast averaging circuit in FIG. 5(a) comprises filter network 32. Filter network 32 comprises a pair of notch filters 32' connected in cascade with $\omega_0$=(1/R*C) and attenuation of minus 60 db at $\omega_0$ plus/minus 10 percent. FIG. 6(a) illustrates a Power Feed Forward signal input (at terminal 1) to filter network 32 in FIG. 5(a) and FIG. 6(b) illustrates the DC output (at terminal 2) response from the filter network, which is the Average Feed Forward Power signal. As shown in FIG. 6(b) the Average Feed Forward Power signal value converges to approximately 99 percent of the average value of 1.0 in about 95 milliseconds at point "A." Typical but non-limiting circuit values for circuit elements in the filter network are illustrated in FIG. 5(a).

Figure 5C:
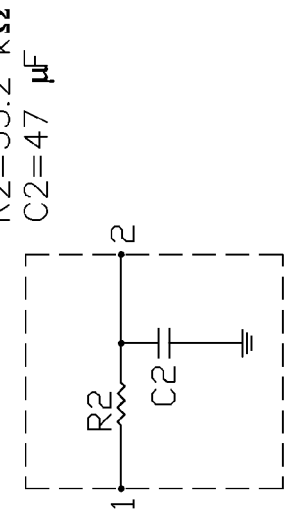
FIG. 5(b) and FIG. 5(c) are comparative filter designs used to illustrate the advantage of the fast average filter network shown in FIG. 5(a).
Figure 5B:
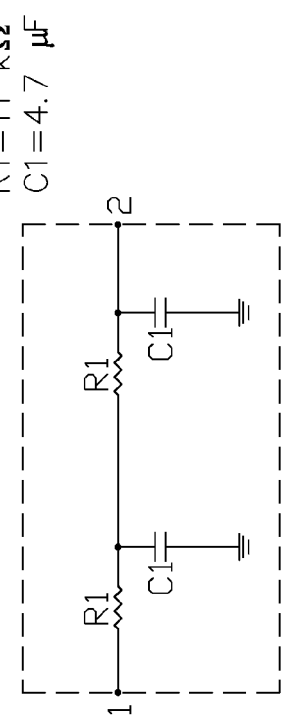

Filter network 32 can be utilized as a fast averaging circuit in any application, beyond the present application, where there is a requirement to quickly determine a DC voltage value that represents the average value of a sinusoidal waveform. The comparative advantage of the filter network shown in FIG. 5(a) for use as a fast averaging circuit is illustrated by comparison with the DC responses of the double pole low pass filter network 32a in FIG. 5(b) and single pole low pass filter 32b in FIG. 5(c). Typical values for circuit elements in the filters are illustrated in FIG. 5(b) and FIG. 5(c).

Figure 8:
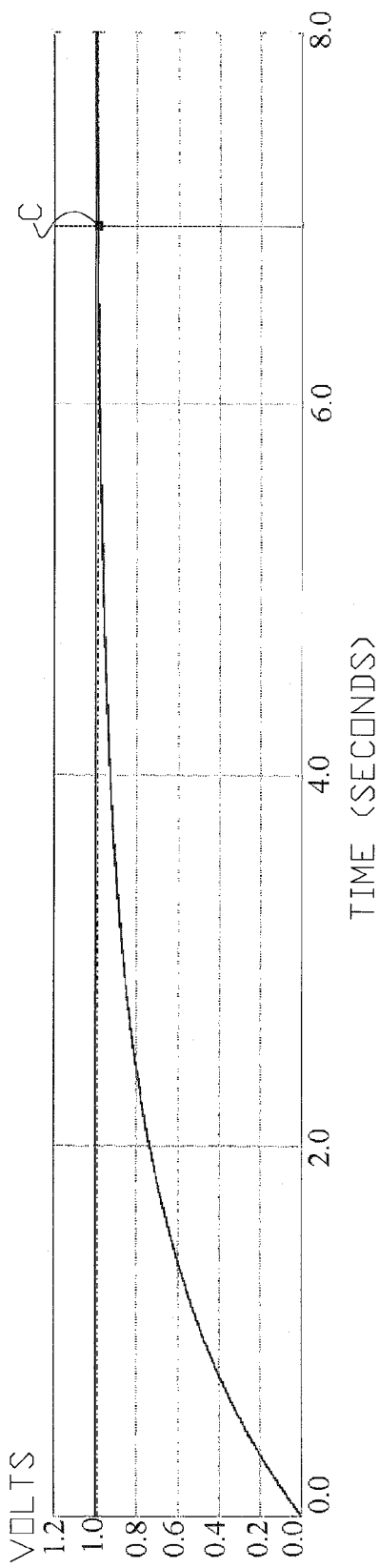
FIG. 8 graphically illustrates the DC output voltage response from the filter shown in FIG. 5(c) with the sinusoidal input shown in FIG. 6(a) or FIG. 6(b).

As illustrated in FIG. 7(a) and FIG. 7(b) for the double pole low pass filter network with $\omega_{0,1}$=(1/R1*C1) and attenuation of minus 60 db at $\omega_0$, minus 10 percent, with the input signal in FIG. 7(a), which is the same as the input signal in FIG. 6(a), the DC output response shown in FIG. 7(b) converges to approximately 99 percent of the average value of 1.0 in approximately 614 milliseconds at point "B." As illustrated in FIG. 8 for the single pole low pass filter with $\omega_{0,2}$=(1/R2*C2) and attenuation of minus 60 db at $\omega_0$ minus 10 percent, for the same input signal shown in FIG. 6(a) or FIG. 7(a), the DC output response converges to approximately 99 percent of the average value of 1.0 in approximately 7.0 seconds at point "C."

While the fast averaging circuit illustrated in FIG. 5(a) is analog, a digital, or combination analog and digital fast averaging circuit may be utilized in some examples of the invention.

The overall result of this servo loop inside the control path is that the power supply controller may seamlessly cross over in a linear manner between maximum current limit mode and power limit mode in response to varying AC source voltages, or in robust response to perturbations in the RMS AC SOURCE voltage or load power draw. Power and current are both actively bounded and linearly controlled by this control scheme. Power quality is preserved through abnormal events, and potential fault modes are avoided by remaining within the designed control boundaries.

This control approach can be made very robust against power and load disturbances due to the flexibility provided by the various state control signals inherent in the method of the present invention. Power conversion control can be modified by automatic limiting of the maximum value of $P_{ref}$ as a function of the AC voltage range to limit dynamic input current at low input voltage ranges. $P_{ref}$ may also be modified as a function of output voltage to limit dynamic output current at low output voltages and constant average output power. The method of the present invention provides various features required to bound and maintain linear control over both instantaneous power and current in response to input and output voltage changes. High power transients and high current transients are thereby avoided by proper design of the control boundaries.

The method of power conversion control of the present invention may be utilized in various applications, including but not limited to, partial or full discharge capacitor charging applications; applications requiring a constant DC voltage output; or applications requiring a programmable DC voltage output. Any one of these applications requires some type of information feedback from the load voltage in order to throttle the power converter's controller. The proposed method of power conversion control of the present invention is flexible with regard to how power flow to the output of the converter is throttled in order to achieve output voltage control. Voltage control is a separate and independent function from power control and power factor control in the method of the present invention.

With the controller of the present invention, power delivery is closed-loop controlled around the input AC SOURCE and parameters established by a user or designer of the converter. The quality and magnitude of the power drawn from the power source are consistent, even if the voltage and instantaneous power consumed by the load is variable. Output voltage may be monitored, and the controller throttled in order not to exceed a maximum output voltage, but the absolute value of the output voltage does not affect the ability of the controller to provide consistent, controlled power with unity power factor and low THD.

One example of the present invention in a capacitor charging application is shown in FIG. 3. The converter's output voltage may be controlled by "end of charge" comparator EOC and an external Programmed Output Voltage ($V_{prog}$) signal. The output of comparator EOC is used to inhibit the gate drive signal to boost switch $X_1$, which stops power conversion and limits the output voltage. If binary logic is used, the power controller resumes full power conversion if the output signal of comparator EOC is "false" (that is, the converter's output voltage is less than $V_{prog}$) while the power controller stops completely if the output signal of comparator EOC is "true" (that is, the converter's output voltage is equal to $V_{prog}$).

The transition from zero power to full power may be made less abrupt by using the output of comparator EOC to reduce the Reference Power signal, $P_{ref}$, or to reduce the internal Limit Current signal, $I_{lim}$. When the output of comparator EOC is "true," $P_{ref}$ may be shorted to ground, which stops power flow to the output of the converter. When the output of comparator EOC is "false," $P_{ref}$ is allowed to ramp in a controlled manner to the maximum value. Full power output is thereby gradually applied.

The modified Limit Current signal scheme illustrated in FIG. 2 may also be optionally incorporated in the capacitor charging application shown in FIG. 3.

Alternatively the transition from zero power to full power may also be made less abrupt by linearly throttling $P_{ref}$ with the output of compensated voltage feedback error amplifier 29 as shown in FIG. 4. When the output voltage of the converter is near the value of the Programmed Output Voltage, $P_{ref}$ is linearly reduced inversely proportional to the difference between the actual output voltage of the converter and the value of the Programmed Voltage Value since the output of error amplifier 29 is summed with the Reference Power signal.

The load charge inhibit control scheme illustrated in FIG. 3 may also be optionally incorporated into the ramp down load charge control scheme illustrated in FIG. 4.

The closed loop power control scheme of the present invention provides fast dynamic control response. The proposed topology is a real-time power factor controller which is independent of output voltage feedback. Compensated error amplifier 24, which drives the PWM gate drive of the representative boost switch has a settling time significantly shorter than one line cycle. A suitable device selection for the error amplifier is type TLC082 (Texas Instruments Inc., Dallas, Tex.). Power feedback is controlled to follow the Power Feed Forward signal. Therefore, closed loop power factor control is maintained with high bandwidth control regardless of output voltage ripple or output voltage transients. Due to the wide bandwidth of the method of the present invention, exact unity power factor is maintained even during abnormal power quality transients where the AC voltage may be temporarily non-sinusoidal. The control method of the present invention mimics the current draw of a purely resistive load, even if the input voltage is temporarily non-sinusoidal. Exact unity power factor and low THD (for example, less than 2.5 percent) are also maintained during fast load voltage transients due to dynamic loading of the output of the power converter.

The apparatus and method of the present invention may be implemented in analog, digital or a combination of analog and digital components and signals wherein an implementation may further comprise at least one computer processor executing at least one computer program in accordance with at least one of the methods of the present invention.

The examples of the invention include reference to specific electrical components. One skilled in the art may practice the invention by substituting components that are not necessarily of the same type but will create the desired conditions or accomplish the desired results of the invention. For example, single components may be substituted for multiple components or vice versa. Circuit elements without values indicated in the drawings can be selected in accordance with known circuit design procedures.

The above examples of the invention have been provided merely for the purpose of explanation, and are not to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses. Those skilled in the art, having the benefit of the teachings of this specification, may effect numerous modifications thereto, and changes may be made without departing from the scope of the invention in its aspects.

The invention claimed is:

1. A method of controlling the power output of a converter having a single phase AC input and a single phase DC output, the single phase DC output controlled by at least one power conversion switch device connected to the converter's DC power bus, the method comprising the steps of:
   generating a unipolar input voltage DC signal proportional to the instantaneous absolute value of a source voltage at the single phase AC input;
   generating an input peak voltage DC signal proportional to the peak value of the rectified voltage of the source voltage;
   generating a converter current signal proportional to the instantaneous magnitude of the DC current on the converter's DC power bus;
   generating a unit sine function value from the product of the unipolar input voltage DC signal and the inverse of the input peak voltage DC signal;
   generating a feed forward current signal from the product of the unit sine function value and a limit current value;
   generating a feed forward power signal from the product of the feed forward current signal and the unipolar input voltage DC signal;
   generating a feedback power signal from the product of the unipolar input voltage DC signal and the converter current signal;
   comparing the feed forward power signal to the feedback power signal to determine a difference power value equal to the difference between the value of the feed forward power signal and the value of the feedback power signal;
   inputting the difference power value to a power conversion switch device controller; and
   outputting a control signal from the power conversion switch device controller to the at least one power conversion switch device, the control signal proportional to the difference power value.

2. The method of claim 1 wherein the power conversion switch device controller is a PWM controller and the control signal is a pulse width gating signal having a pulse width proportional to the difference power value.

3. The method of claim 1 wherein the limit current value is proportional to a control value of the maximum RMS current of a source current at the single phase AC input.

4. The method of claim 1 further comprising the step of limiting the maximum value of the current limit value responsive to a change in voltage magnitude of the source voltage or the voltage magnitude of the single phase DC output.

5. The method of claim 1 further comprising the steps of:
   generating a fast average feed forward power signal;
   comparing the value of the fast average feed forward power signal with the value of a power reference signal proportional to a control value of the maximum average power supplied to the single phase AC input to determine a difference fast power value equal to the difference between the value of the fast average feed forward power signal and the value of the power reference signal; and
   determining the limit current value from the sum of the difference fast power value and a control value of the maximum RMS current of a source current at the single phase AC input.

6. The method of claim 5 wherein the step of generating the fast average feed forward power signal comprises the step of inputting the feed forward power signal to a cascaded pair of notch filters for output of the fast average feed forward power signal from the cascaded pair of notch filters.

7. The method of claim 5 further comprising the step of limiting the maximum value of the power reference signal responsive to a change in voltage magnitude of the source voltage or the voltage magnitude of the single phase DC output.

8. The method of claim 1 wherein a capacitive load is connected to the single phase DC output, the method further comprising the steps of:
   comparing the voltage value of the capacitive load with a control load voltage reference value to determine a load voltage difference value equal to the difference between the voltage value of the capacitive load and the control load voltage reference value;
   inputting the load voltage difference value to the power conversion switch device controller; and
   inhibiting the control signal from the power conversion switch device controller when the voltage value of the capacitive load is equal to or greater than the control load voltage reference value.

9. The method of claim 1 wherein a capacitive load is connected to the single phase DC output, the method further comprising the steps of:
   comparing the voltage value of the capacitive load with a control load voltage reference value to determine a load voltage difference value equal to the difference between the voltage value of the capacitive load and the control load voltage reference value; and
   setting the value of the limit current signal to zero when the voltage value of the capacitive load is equal to or greater than the control load voltage reference value.

10. The method of claim 5 wherein a capacitive load is connected to the single phase DC output, the method further comprising the steps of:
    comparing the voltage value of the capacitive load with a control load voltage reference value to determine a load voltage difference value equal to the difference between the load value of the capacitive load and the control load voltage reference value; and
    setting the value of the power reference signal to zero when the voltage value of the capacitive load is equal to or greater than the control load voltage reference value.

11. The method of claim 1 wherein a capacitive load is connected to the single phase DC output, the method further comprising the steps of:
    comparing the load voltage of the capacitive load with a control load voltage reference value to determine a load voltage difference value equal to the difference between the voltage value of the capacitive load and the control load voltage reference value;
    generating a fast average feed forward power signal;
    comparing the value of the fast average feed forward power signal with the value of the sum of the value of a power reference signal proportional to a control value of the maximum average power supplied to the single phase AC input and the load voltage difference value to determine a difference fast power value equal to the difference between the value of the fast average feed forward power signal and the sum of the value of the power reference signal and the load difference value; and
    determining the limit current value from the sum of the difference fast power value and a control value of the maximum RMS current of a source current at the single phase AC input.

12. The method of claim 11 further comprising the steps of:
inputting the load voltage difference value to the power conversion switch device controller; and
inhibiting the control signal from the power conversion switch device controller when the capacitive load voltage value is equal to or greater than the control load voltage reference value.

13. A power control system for a power converter, the power converter having a single phase AC input, a single phase DC output, and at least one power conversion switch device for control of the single phase DC output, the at least one power conversion switch device connected to the converter's DC power bus, the power control system comprising:
a rectifier and peak voltage circuit having an input from the single phase AC input, a first output proportional to the instantaneous absolute value of a source voltage at the single phase AC input, and a second output proportional to the peak value of the rectified source voltage;
a current sensor for sensing the instantaneous magnitude of current on the converter's DC power bus, the current sensor having an output proportional to the instantaneous magnitude of current on the converter's DC power bus;
a unit sine function generator circuit having a first and second inputs from the first and second outputs of the rectifier and peak voltage circuits, and an output equal to the instantaneous value of the unit sine function;
a current limit circuit having an output proportional to the instantaneous RMS current at the single phase AC input;
a feed forward current circuit having a first input from the output of the unit sine function generator circuit, a second input from the output of the current limit circuit, and an output equal to the control magnitude and wave shape of the instantaneous current draw by the converter from the single phase AC input;
a feed forward power circuit having a first input from the first output of the rectifier and peak voltage circuit, a second input from the output of the feed forward current circuit, and an output equal to the control magnitude and wave shape of the instantaneous power draw by the converter from the single phase AC input;
a feedback power circuit having a first input from the first output of the rectifier and peak voltage circuit, a second input from the output of the current sensor, and an output equal to the instantaneous power draw by the converter from the single phase AC input;
a power comparator circuit having a first input from the output of the feed forward power circuit, a second input from the output of the feedback power circuit, and an output equal to the difference between the first and second inputs of the power comparator circuit; and
a switch controller having an input from the output of the power comparator circuit and an output proportional to the magnitude of the difference between the first and second inputs of the power comparator circuit, the output of the switch controller inputted to the at least one power conversion switch device to control the power output of the power converter.

14. The power control system of claim 13 wherein the switch controller comprises a PWM controller.

15. The power control system of claim 13 further comprising a fast average feed forward power comparator circuit having an input from the output of the feed forward power circuit and an output connected to the current limit circuit, the output of the fast average feed forward power comparator circuit equal to the difference between the fast average of the output of the feed forward power circuit and the output of a power reference circuit proportional to a control value of the maximum average power supplied to the single phase AC input.

16. The power control system of claim 15 wherein the fast average feed forward power comparator circuit comprises a cascaded pair of notch filters and a comparator, the input of the fast average feed forward power comparator circuit connected to the input of the cascaded pair of notch filters, the output of the cascaded pair of notch filters connected to a first input of the comparator, the output of the power reference circuit connected to a second input of the comparator, the output of the fast average feed forward power comparator circuit provided from the output of the comparator.

17. The power control system of claim 13 further comprising:
a capacitive load connected to the single phase DC output; and
an end of charge circuit having a first input equal to the instantaneous voltage of the capacitive load, a second input from the output of a voltage reference circuit, and an output equal to an inhibit control signal when the instantaneous voltage of the capacitive load is at least equal to the output of the voltage reference circuit, the output of the end of charge circuit connected to the switch controller.

18. The power control system of claim 16 further comprising:
a capacitive load connected to the single phase DC output; and
a power reference throttling circuit having a first input equal to the instantaneous voltage of the capacitive load, a second input from the output of a voltage reference circuit, and an output equal to the difference between the instantaneous voltage of the capacitive load and the output of the voltage reference circuit, the output of the power reference throttling circuit summed to the output of the power reference circuit.

* * * * *